United States Patent
Kambe

(10) Patent No.: US 7,737,363 B2
(45) Date of Patent: Jun. 15, 2010

(54) HALOGEN-FREE RESIN COMPOSITION, COVERED WIRE COVERED WITH THAT AND WIRING HARNESS WITH AT LEAST ONE ABOVE COVERED WIRE

(75) Inventor: Makoto Kambe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/318,991

(22) Filed: Jan. 14, 2009

(65) Prior Publication Data

US 2009/0183893 A1 Jul. 23, 2009

(30) Foreign Application Priority Data

Jan. 23, 2008 (JP) .............................. 2008-012388

(51) Int. Cl.
*H01B 7/00* (2006.01)
(52) U.S. Cl. .............................. 174/110 R; 174/120 R; 174/120 C
(58) Field of Classification Search .................. 174/36, 174/110 R, 113 R, 120 R, 120 C, 121 A, 174/121 AR, 121 SR
See application file for complete search history.

(56) References Cited

U.S. PATENT DOCUMENTS

| 6,414,059 | B1 * | 7/2002 | Kobayashi et al. | .......... 524/101 |
| 6,852,921 | B1 * | 2/2005 | Koike et al. | .................... 174/36 |
| 6,995,198 | B2 * | 2/2006 | Toshimitsu et al. | ......... 523/204 |
| 7,511,087 | B2 * | 3/2009 | Hoshio et al. | ................ 523/210 |

FOREIGN PATENT DOCUMENTS

JP 2005-248110 9/2005

* cited by examiner

*Primary Examiner*—William H Mayo, III
(74) *Attorney, Agent, or Firm*—Edwards Angell Palmer & Dodge LLP

(57) ABSTRACT

A halogen-free resin composition for a covered wire and a wiring harness which has a base resin composition of 100 weight division having 45 to 65% by weight of a polypropylene resin, 15 to 30% by weight of a low-density polyethylene resin, 15 to 30% by weight of a styrene thermoplastic elastomer, and a metal hydrate of 80-120 weight division. The styrene thermoplastic elastomer of the composition is an aromatic vinyl-conjugated diene system block copolymer and with a peak temperature of dynamic factor (tan δ) thereof measured in a range from −100 to 50° C. by a dynamic viscoelasticity measurement device being made in 0-30° C.

3 Claims, No Drawings

HALOGEN-FREE RESIN COMPOSITION, COVERED WIRE COVERED WITH THAT AND WIRING HARNESS WITH AT LEAST ONE ABOVE COVERED WIRE

The priority application Number Japan Patent Application 2008-012388 upon which this patent application is based is hereby incorporated by reference.

BACKGROUND OF THE INVENTION

1. Field of the Invention

This invention relates to a halogen-free resin composition, a covered wire covered with the halogen-free resin composition and a wiring harness with a plurality of the covered wires.

2. Description of the Related Art

An electric covered wire, in which a conductive wire, such as a copper wire, is covered with a resin composition based on a polyvinyl chloride resin, is usually used for wiring as a covered wire in a vehicle. A polyvinyl chloride resin has good material characteristics, such as high flame retardant performance because of a self-extinguish material, and good adjustability of hardness by adding a plasticizer and high wear-resistance. However, the polyvinyl chloride resin generates harmful gases such as halogen gas when burning by incineration or vehicle fire, and it makes environmental problems.

To overcome this problem, in recent years, a halogen-free resin composition based on a polyolefin resin has been developed (for example, refer Patent document 1: Japan Patent Application Published No. 2005-248110). In the Patent document 1, the halogen-free resin composition including an amorphous olefin copolymer, an aromatic vinyl conjugated diene block copolymer with a hydrogen additive, and a polyolefin resin is described as the halogen-free resin composition improving weather resistance, formability, heat-resistance, abrasive resistance and deformation recoverability. Also, in the patent document 1, an inorganic flame retardant, such as a magnesium hydroxide as a flame retardant can be added to the halogen-free resin composition.

SUMMARY OF THE INVENTION

Objects to be Solved

However, for achieving desired flame retardant performance, it is required to add a large quantity of inorganic flame retardant into a base resin composition of the halogen-free resin composition. It results that mechanical characteristics, abrasion resistance and flexibility of the halogen-free resin composition become significantly worse.

To overcome the above problem, an object of the present invention is to provide halogen-free resin composition improving its mechanical characteristics, abrasion resistance, flame retardant performance and flexibility even if adding flame retardant, and a covered wire covered with that and a wiring harness with at least one covered wire.

How to Attain the Object of the Present Invention

In order to attain the object of the present invention, a halogen-free resin composition includes a base resin composition of 100 weight division, which includes 45 to 65% by weight of a polypropylene resin, 15 to 30% by weight of a low-density polyethylene resin, and 15 to 30% by weight of a styrene thermoplastic elastomer; and a metal hydrate of 80-120 weight division; and the styrene thermoplastic elastomer is an aromatic vinyl-conjugated diene block copolymer; and a peak temperature of a dynamic loss factor (tan δ) of the styrene thermoplastic elastomer measured in a range from −100° C. to 50° C. by a dynamic viscoelasticity measurement device is made in between 0-30° C.

According to the present invention, a covered wire includes a conductive wire, and a cover covering the conductive wire, and the cover is formed with the halogen-free resin composition mentioned above.

According to the present invention, a wiring harness formed by banding a plurality of covered wires, includes at least one wire of the plurality of covered wires being structured with the covered wire mentioned above.

Effects of Invention

According to the present invention, the halogen-free resin composition, which includes the base resin composition of 100 weight division having 45 to 65% by weight of the polypropylene resin, 15 to 30% by weight of the low-density polyethylene resin, and 15 to 30% by weight of the styrene thermoplastic elastomer; and the metal hydrate of 80-120 weight division, is characterized in that the styrene thermoplastic elastomer is the aromatic vinyl-conjugated diene block copolymer, and the peak temperature of a dynamic loss factor (tan δ) of the styrene thermoplastic elastomer measured in the range from −100° C. to 50° C. by a dynamic viscoelasticity measurement device is made in between 0-30° C., so that mechanical characteristics, abrasion resistance, flame retardant performance and flexibility of the resin component can be improved by maintaining the mechanical characteristics of the polypropylene resin and improving the abrasion resistance and the flexibility of the resin composition by the low-density polyethylene resin and the styrene thermoplastic elastomer even if large quantity of flame retardant is added.

According to the present invention, the cover covering the conductor is formed with the halogen-free resin composition mentioned above, so that the mechanical characteristics, the abrasion resistance, flame retardant performance and the flexibility of the wire can be improved.

According to the present invention, at least one wire of the plurality of the covered wires is structured with the covered wire mentioned above, so that the mechanical characteristics, the abrasion resistance, flame retardant performance and the flexibility of the wiring harness can be improved.

DESCRIPTION OF THE PREFERRED EMBODIMENT

A halogen-free resin composition of an embodiment according to the present invention is described as following. The halogen-free resin composition includes a base resin composition of 100 weight division having 45 to 65% by weight of a polypropylene resin, 15 to 30% by weight of a low-density polyethylene resin, 15 to 30% by weight of a styrene thermoplastic elastomer; and a metal hydrate of 80-120 weight division. The styrene thermoplastic elastomer is formed by an aromatic vinyl-conjugated diene block copolymer, and a peak temperature of a dynamic loss factor (tan δ) of the styrene thermoplastic elastomer measured in a range from −100° C. to 50° C. by a dynamic viscoelasticity measurement device is made in between 0-30° C.

As examples of the polypropylene resin mentioned above, a propylene homopolymer, a propylene-ethylene random copolymer, a propylene-α-olefin random copolymer, and a propylene-ethylene-α-olefin random copolymer are listed. As an α-olefin, an α-olefin with carbon number of 4 to 12, for example, 1-butene, 1-pentene, 4-methyl-1-pentene, 1-hexene, 1-octene, 1-decene, and 1-dodecene are listed. These α-olefins can be used alone or in combination of two or more types therefrom.

These polypropylene resins can be used alone or in combination of two or more types therefrom. In addition, the polypropylene resin is not limited in listed resins, but polypropylene resin other than the listed resin can be used within the scope of the present invention.

The low-density polyethylene resin mentioned above is polyethylene resin formed by bonding ethylene randomly with a branch. The low-density polyethylene resin having a density not less than 0.910 to 0.930 is used. The low-density polyethylene resin has lower hardness than that of high-density polyethylene resin formed by bonding ethylene in a straight chain.

The styrene thermoplastic elastomer is an aromatic vinyl-conjugated diene block copolymer, and is formed into block polymer structured with polymer block having a structural unit derived from aromatic vinyl compound as a main body (aromatic vinyl block), and polymer block having a structural unit derived from conjugated diene compound as a main body (conjugated diene block).

As examples of the aromatic vinyl compound mentioned above, styrene, α-methylstyrene, p-methylstyrene, vinyltoluene, monochloro styrene, dichlorostyrene, monobromo styrene, dibromo styrene, fluorostyrene, p-tert-butylstyrene, ethylstyrene, and vinylnaphthalene are listed. The styrene is particularly desirable. These compounds can be used alone or in combination of two or more types therefrom. The aromatic vinyl compound is not limited to these compounds, and aromatic compounds other than the compounds mentioned above can be applied within the scope of the present invention.

As examples of the conjugated diene compound mentioned above, 1,3-butadiene and substitution conjugated diene can be listed. The substitution conjugated diene is preferred, and, for example, isoprene, 2,3-dimethyl-1,3-butadiene, 2-neopenty-1,3-butadiene, 2-chloro-1,3-butadiene, 2-cyano-1,3-butadiene, substitution linear-chain conjugated pentadiene, substitution linear chain conjugation hexadiene can be listed. The isoprene is more desirable. These compounds can be used alone or in combination of two or more types therefrom. The conjugated diene compounds are not limited to these compounds, and the compounds other than the compounds mentioned above can be applied within the scope of the present invention.

In addition, the peak temperature of the dynamic loss factor (tan δ) of the styrene thermoplastic elastomer measured in the range from −100° C. to 50° C. by the dynamic viscoelasticity measurement device is made in between 0-30° C. The peak temperature (T tan δ) is given as the temperature corresponding to the relative maximum value of dynamic loss factors (tan δ=E"/E') led by measuring each dynamic storage modulus (E') and each dynamic loss modulus (E") of a test piece of the styrene thermoplastic elastomer at every 1° C. step-up when heating the test piece of the styrene thermoplastic elastomer with a constant rise ratio from −100° C. to 50° C. by the dynamic viscoelasticity measurement device. When the peak temperature (T tan δ) is less than 0° C., the abrasion resistance of the halogen-free resin composition cannot be improved sufficiently (see below Comparative examples 11-13 to be compared).

As such styrene thermoplastic elastomer, HYBRAR 5127 by a product name (made by Kuraray) is already commercially available and it is used for manufacturing a damping sheet. When the present inventor was studying to supply halogen-free resin composition in which mechanical characteristics, abrasion resistance, flame retardant performance and flexibility can be improved even if flame retardant is added, it was found that mechanical characteristics, abrasion resistance, flame retardant performance and flexibility of halogen-free resin composition included with styrene thermoplastic elastomer can be improved even if flame retardant is added therein, and it resulted the present invention.

The base resin composition includes 45-65% by weight of the above-mentioned polypropylene resin, 15-30% by weight of the low-density polyethylene resin, and 15-30% by weight of the styrene thermoplastic elastomer, and theses in total form 100% by weight. When the polypropylene resin is less than 45% by weight, enough abrasion resistance of the composition cannot be given (see below Comparative example 2). When the polypropylene resin is more than 65% by weight, flexibility of the composition will be reduced (Comparative example 1). When the low-density polyethylene resin is less than 15% by weight, enough abrasion resistance of the composition cannot be give (Comparative example 9). When the low-density polyethylene resin is more than 30% by weight, the abrasion resistance and flexibility of the composition will be decreased (Comparative example 10).

In addition, when the styrene thermoplastic elastomer is less than 15% by weight, sufficient abrasion resistance and sufficient flexibility of the composition cannot be given (Comparative example 7). When the styrene thermoplastic elastomeric more than 30% by weight, the abrasion resistance of the composition will be reduced (Comparative example 8).

The metal hydrate will be added as a flame retardant. As examples of the metal hydrate, magnesium hydroxide, aluminum hydroxide, antimony trioxide, antimony pentoxide, and zinc borate are listed. These materials are used alone or in combination of two or more types therefrom. The metal hydrates are not limited to these materials, and the metal hydrates other than the metal hydrates mentioned above can be applied within the scope of the present invention.

The metal hydrate of 80-120 weight division corresponding to the base resin composition of 100 weight division is added into the base resin composition. When the metal hydrate is less than 80 weight division, sufficient flame retardant performance cannot be given (Comparative example 5). When the metal hydrate is more than 120 weight division, the flame retardant performance of the composition cannot be improved corresponding to increase of the metal hydrate, and extensibility (tensile elongation) and abrasion resistance of the composition will be reduced (Comparative example 6).

According to the halogen-free resin composition structured as mentioned above, by containing the polypropylene resin, the mechanical characteristics and chemical resistance of the composition are improved, and by containing the low-density polyethylene resin, abrasion resistance and flexibility of the composition are improved, and by containing the styrene thermoplastic elastomer, abrasion resistance of the composition, which the olefin thermoplastic elastomer does not have, is improved, and by containing the metal hydrate, flame retardant performance of the composition is improved.

Each component structuring the halogen-free resin composition of the embodiment does not contain halogen, so that no halogen gas will be generated during combustion. Furthermore, the halogen-free resin composition of the embodiment is a non-bridge-type, and can be easily recycled. Furthermore, the halogen-free resin composition of the embodiment can be added antioxidants, metal scavenger, colorant, lubricant, antistatic agents, and foaming agents in a range without damaging effects of the invention.

The halogen-free resin composition is structured as mentioned above and compounded by kneading in a various known way. For example, after pre-blending the components thereof by a high-speed mixing machine, such as Henschel mixer (product name), the halogen-free resin composition is applied by a kneading machine, such as a single spindle extruder, a double-spindle extruder, a Banbury mixer, a kneader, and a roll mill.

Next, a covered wire covered with the halogen-free resin composition of the embodiment and a wiring harnesses having the covered wire will be explained. The covered wire can be applied to any types and structures of covered wire with no limitation, for example, a solid wire, a flat wire, and a shielded wire. The covered wire is provided with a conductor, and a cover covering the conductor, and cover is formed with the halogen-free resin composition according to the invention. The conductor is formed into a long line with copper, aluminum or other metal. The conductor may be one wire or plural wires. The other insulation can exist between the conductor and the cover.

In the above-mentioned covered wire, a various known way can be applied for covering the conductor with the halogen-free resin composition in a way to cover. For example, a typical extrusion method can be used. A single spindle extrusion machine with a cylinder diameter of 20-90 mm diameter and L/D of 10-40, having a screw, a breaker plate, a cross head, a distributor, a nipple and a dice is used. The halogen-free resin composition is thrown into the single spindle extrusion machine, in which a temperature is set to melt sufficiently the halogen-free resin composition. The halogen-free resin composition is melted and kneaded by the screw, and a predetermined constant amount thereof is supplied through the breaker plate to the cross head. The melted halogen-free resin composition flows around the nipple by the distributor and is extruded by the die so as to cover around the conductor, so that the covered wire is provided.

The wiring harness is formed by binding plural covered wires. An end of the covered wire, for example, is joined to a connector. The connector includes a terminal formed by pressing a sheet metal and a connector housing made of synthetic resin. The terminal is joined electrically to the conductor and received in the connector housing. The connector is connected with a mating connector mounted at an electronic device, and the wiring harness transmits electric power and control signals to the electronic device.

According to this embodiment, the halogen-free resin composition includes the base resin composition of 100 weight division, which includes 45 to 65% by weight of the polypropylene resin, 15 to 30% by weight of the low-density polyethylene resin, and 15 to 30% by weight of the styrene thermoplastic elastomer; and the metal hydrate of 80-120 weight division; and the styrene thermoplastic elastomer is the aromatic vinyl-conjugated diene block copolymer; and the peak temperature of a dynamic loss factor (tan δ) of the styrene thermoplastic elastomer measured in a range from −100° C. to 50° C. by a dynamic viscoelasticity measurement device is made in between 0-30° C. Thereby, the mechanical properties of polypropylene resin can be maintained, and mechanical characteristics, abrasion resistance, flame retardant performance and flexibility of the resin composition can be improved by the low-density polyethylene resin and styrene thermoplastic elastomer even if large amounts of flame retardant is added.

Since the cover covering the conductor of the covered wire is the halogen-free resin composition, mechanical characteristics, abrasion resistance, flame retardant performance and flexibility of the covered wire can be improved.

Since at least one covered wire of the plural covered wires of the wiring harness is the covered wire mentioned above, mechanical characteristics, abrasion resistance, flame retardant performance and flexibility of the wiring harnesses can be improved.

Embodiment 1

45% by weight of the polypropylene resin (PS201A, made by Sunallomer Ltd.), 30% by weight of the low-density polyethylene resin (NOVATEC LD ZE41K, made by Japan Polyethylene Corp.), and 25% by weight of styrene thermoplastic elastomer A (HYBRAR 5127, T tan δ=20° C., made by Kuraray Co., Ltd.) are blended to be a base resign composition. The base resin composition of 100 weight division added with the metal hydrate (magnesium hydroxide, KISUMA 5A, made by Kyowa Chemical) of 90 weight division is mixed by a Henschel mixer with capacity of 20 liters, and kneaded at die temperature of 200° C. by a Φ40 mm double-spindle extruder, thereafter formed into a molding pellet of the halogen-free resin composition. The molding pellets are inputted to a wire coating machine (Φ60 mm, L/D=24.5, FF screw), and extruded on a conductor with area of 0.3395 mm square (stranded wire 0.2485 mm×7) at extruding speed 600 mm/min, extrusion temperature 230° C., to manufacture a covered wire with a product outer diameter of 1.20 mm.

Embodiment 2

50% by weight of the polypropylene resin, 20% by weight of the low-density polyethylene resin, and 30% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are melted and extruded on a conductor with area to manufacture a covered wire similarly as Embodiment 1.

Embodiment 3

55% by weight of the polypropylene resin, 25% by weight of the low-density polyethylene resin, and 20% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are melted and extruded on a conductor with area to manufacture a covered wire similarly as Embodiment 1.

Embodiment 4

65% by weight of the polypropylene resin, 15% by weight of the low-density polyethylene resin, and 20% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Embodiment 1.

Embodiment 5

55% by weight of the polypropylene resin, 25% by weight of the low-density polyethylene resin, and 20% by weight of styrene thermoplastic elastomer A are blended to be a base resign composition. The base resin composition of 100 weight division added with the metal hydrate of 80 weight division is mixed and formed into a molding pellet of the halogen-free resin composition. The molding pellets are extruded on a conductor with area to manufacture a covered wire similarly as Embodiment 1.

Embodiment 6

55% by weight of the polypropylene resin, 25% by weight of the low-density polyethylene resin, and 20% by weight of styrene thermoplastic elastomer A are blended to be a base resign composition. The base resin composition of 100 weight division added with the metal hydrate of 120 weight division is mixed and formed into a molding pellet of the halogen-free resin composition. The molding pellets are extruded on a conductor with area to manufacture a covered wire similarly as Embodiment 1.

Embodiment 7

55% by weight of the polypropylene resin, 30% by weight of the low-density polyethylene resin, and 15% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Embodiment 1.

Comparative Example 1

70% by weight of the polypropylene resin (PS201A, made by Sunallomer Ltd.), 15% by weight of the low-density polyethylene resin (NOVATEC LD ZE41K, made by Japan Polyethylene Corp.), and 15% by weight of styrene thermoplastic elastomer A (HYBRAR 5127, T tan δ=20° C., made by Kuraray Co., Ltd.) are blended to be a base resign composition. The base resin composition of 100 weight division added with the metal hydrate (magnesium hydroxide, KISUMA 5A, made by Kyowa Chemical) of 90 weight division is mixed by the Henschel mixer with capacity of 20 liters, and kneaded at die temperature of 200° C. by a Φ40 mm double-spindle extruder, thereafter formed into the molding pellet of the halogen-free resin composition. The molding pellets are inputted to a wire coating machine (Φ60 mm, L/D=24.5, FF screw), and extruded on a conductor with area of 0.3395 mm square (stranded wire 0.2485 mm×7) at extruding speed 600 mm/min, extrusion temperature 230° C., to manufacture a covered wire with a product outer diameter of 1.20 mm.

Comparative Example 2

40% by weight of the polypropylene resin, 30% by weight of the low-density polyethylene resin, and 30% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 3

55% by weight of the polypropylene resin, 35% by weight of the low-density polyethylene resin, and 10% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 4

55% by weight of the polypropylene resin, 10% by weight of the low-density polyethylene resin, and 35% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 5

55% by weight of the polypropylene resin, 25% by weight of the low-density polyethylene resin, and 20% by weight of styrene thermoplastic elastomer A are blended to be a base resign composition. The base resin composition of 100 weight division added with the metal hydrate of 75 weight division is mixed and formed into a molding pellet of the halogen-free resin composition. The molding pellets are extruded on a conductor with area to manufacture a covered wire similarly as Comparative example 1.

Comparative Example 6

55% by weight of the polypropylene resin, 25% by weight of the low-density polyethylene resin, and 20% by weight of styrene thermoplastic elastomer A are blended to be a base resign composition. The base resin composition of 100 weight division added with the metal hydrate of 150 weight division is mixed and formed into a molding pellet of the halogen-free resin composition. The molding pellets are extruded on a conductor with area to manufacture a covered wire similarly as Comparative example 1.

Comparative Example 7

60% by weight of the polypropylene resin, 30% by weight of the low-density polyethylene resin, and 10% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 8

50% by weight of the polypropylene resin, 15% by weight of the low-density polyethylene resin, and 35% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 9

60% by weight of the polypropylene resin, 10% by weight of the low-density polyethylene resin, and 30% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 10

50% by weight of the polypropylene resin, 35% by weight of the low-density polyethylene resin, and 15% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 11

45% by weight of the polypropylene resin, 30% by weight of the low-density polyethylene resin, and 25% by weight of styrene thermoplastic elastomer B (HYBRAR 7125, T tan $\delta$=−5° C., made by Kuraray Co., Ltd.) are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 12

50% by weight of the polypropylene resin, 20% by weight of the low-density polyethylene resin, and 30% by weight of styrene thermoplastic elastomer B are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

Comparative Example 13

55% by weight of the polypropylene resin, 25% by weight of the low-density polyethylene resin, and 20% by weight of styrene thermoplastic elastomer A are blended to be a base resign composition. The base resin composition of 100 weight division added with the metal hydrate of 90 weight division is mixed and formed into a molding pellet of the halogen-free resin composition. The molding pellets are extruded on a conductor with area to manufacture a covered wire similarly as Comparative example 1.

With regard to covered wires given by Embodiments 1-7 and Comparative examples 1-13, the following test and evaluation were acted and the results are listed to Tables 1-3.

TABLE 1

|  | EMBODIMENT 1 | EMBODIMENT 2 | EMBODIMENT 3 | EMBODIMENT 4 | EMBODIMENT 5 | EMBODIMENT 6 | EMBODIMENT 7 |
|---|---|---|---|---|---|---|---|
| EXTENSIBILITY | PASS | PASS | PASS | PASS | PASS | PASS | PASS |
| ABRASION RESISTSNCE | PASS | PASS | PASS | PASS | PASS | PASS | PASS |
| FLEXIBILITY | PASS | PASS | PASS | PASS | PASS | PASS | PASS |
| FLAME RETARDENT PERFORMANCE | PASS | PASS | PASS | PASS | PASS | PASS | PASS |

TABLE 2

|  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|---|---|---|---|---|
| EXTENSIBILITY | PASS | PASS | PASS | PASS | PASS | FAIL | PASS | PASS | PASS | PASS |
| ABRASION RESISTSNCE | PASS | FAIL | FAIL | FAIL | PASS | FAIL | FAIL | FAIL | FAIL | FAIL |
| FLEXIBILITY | FAIL | PASS | FAIL | PASS | PASS | PASS | FAIL | PASS | PASS | FAIL |
| FLAME RETARDENT PERFORMANCE | PASS | PASS | PASS | PASS | FAIL | PASS | PASS | PASS | PASS | PASS |

TABLE 3

| | COMPARATIVE EXAMPLE 11 | COMPARATIVE EXAMPLE 12 | COMPARATIVE EXAMPLE 13 |
|---|---|---|---|
| EXTENSIBILITY | PASS | PASS | PASS |
| ABRASION RESISTSNCE | FAIL | FAIL | FAIL |
| FLEXIBILITY | PASS | PASS | PASS |
| FLAME RETARDENT PERFORMANCE | PASS | PASS | PASS |

Evaluation of Extensibility:

A test piece formed only with the halogen-free resin composition is made by cutting the covered wire in a 150 mm length, and removing the conductor. Thereafter, the test piece is putted with mark lines in intervals 50 mm at a central area thereof. The test piece is mounted at both ends thereof to each clamp of a tensile testing machine, and extended at tension speed of mm/min at room temperature, and a distance between the mark lines was measured. The cover, coefficient of extension of which is not less than 300%, is defined "pass". The cover, coefficient of extension of which is less than 300%, is defined "fail".

Evaluation of Abrasion Resistance:

Abrasion resistance is measured by scrape abrasion test equipment. The covered wire with about 1 m length is mounted and clamped at a sample holder. A plunge, at the tip of which a piano wire with a diameter of 0.45 mm is provided, is pushed to the covered wire with a total load of 7 N by using pushing device, and moved in reciprocating motion (stroke 14 mm), and reciprocation number until the cover is worn out and the piano wire of the plunge touches on the conductor of the covered wire is counted. The covered wire, the reciprocation number of which is not less than 100, is defined "pass". The covered wire, the reciprocation number of which is less than 100, is defined "fail".

Evaluation of Flexibility:

Shore D hardness of the cover is measured to comply with JIS K6253. The covered wire, Shore D hardness of which is not less than 55 and not more than 60, is defined "pass". The covered wire, Shore D hardness of which is less than 55 and more than 60, is defined "fail".

Evaluation of Flame Retardant Performance:

The covered wire having 600 mm or more length is mounted with a tilt angle of 45 degree in a windless chamber, and exposed at a position of the covered wire at 500 mm±5 mm from the top edge of the covered wire in reducing flame of the Bunsen burner for 15 seconds. Time until extinction is measured. Covered wire, time of extinction of which is within 70 seconds, is defined "pass". Covered wire, time of extinction of which is over 70 seconds, is defined "fail".

The covered wires covered with the halogen-free resin composition of the present invention have good results about all of extensibility, abrasion resistance, flexibility, and flame retardant performance as shown by the embodiments 1-7 in Table 1. Especially, it is confirmed that the covered wires have enough performances of extensibility, abrasion resistance, flexibility, and flame retardant performance, those are required for a wiring harness. Oppositely, the covered wires according to comparative examples have no good result about at least one from extensibility, abrasion resistance, flexibility, and flame retardant performance as shown by the comparative examples 1-13 in Tables 2 and 3. Especially, the covered wires does not have enough performances of extensibility, abrasion resistance, flexibility, and flame retardant performance, those are required for the wiring harness.

Also, comparing with Embodiment 1 and Comparative example 11, comparing with Embodiment 2 and Comparative example 12, comparing with Embodiment 3 and Comparative example 13, the cover does not have enough abrasion resistance when the peak temperature (T tan δ) of the dynamic loss factor (tan δ) of the styrene thermoplastic elastomer is less than 0° C. even if required quantity of each component forming halogen-free resin composition is included.

The above-mentioned embodiment of the present invention is a typical example, and the invention is not limited in the embodiment. That is, it is to be understood that changes and variations may be made without departing from the scope of the invention.

What is claimed is:

1. A halogen-free resin composition, consisting of:
   a base resin composition of 100 weight division;
      the base resin composition comprising:
      45 to 65% by weight of polypropylene resin,
      15 to 30% by weight of low-density polyethylene resin,
      15 to 30% by weight of styrene thermoplastic elastomer, and
   a metal hydrate of 80-120 weight division,
   wherein the styrene thermoplastic elastomer is an aromatic vinyl-conjugated diene block copolymer, and
   a peak temperature of a dynamic loss factor (tan δ) of the styrene thermoplastic elastomer measured in a range from −100° C. to 50° C. by a dynamic viscoelasticity measurement device is made in between 0-30° C.

2. A covered wire, comprising:
   a conductive wire; and
   a cover covering the conductive wire, the cover being formed with the halogen-free resin composition according to claim 1.

3. A wiring harness formed by banding a plurality of covered wires, comprising at least one wire of the plurality of covered wires being structured with the covered wire according to claim 2.

* * * * *